US011911639B2

(12) United States Patent
Sauerbier et al.

(10) Patent No.: US 11,911,639 B2
(45) Date of Patent: Feb. 27, 2024

(54) PORTABLE TOOL FOR MOBILE USE

(71) Applicant: LUKAS Hydraulik GmbH, Erlangen (DE)

(72) Inventors: Carsten Sauerbier, Lauf an der Pegnitz (DE); Thomas Littwin, Fürth (DE)

(73) Assignee: LUKAS HYDRAULIK GMBH, Erlangen (DE)

( * ) Notice: Subject to any disclaimer, the term of this patent is extended or adjusted under 35 U.S.C. 154(b) by 234 days.

(21) Appl. No.: 17/296,809

(22) PCT Filed: Nov. 26, 2018

(86) PCT No.: PCT/EP2018/082545
§ 371 (c)(1),
(2) Date: May 25, 2021

(87) PCT Pub. No.: WO2020/108727
PCT Pub. Date: Jun. 4, 2020

(65) Prior Publication Data
US 2022/0001215 A1 Jan. 6, 2022

(51) Int. Cl.
*A62B 3/00* (2006.01)
*B25F 5/02* (2006.01)
*B25F 5/00* (2006.01)

(52) U.S. Cl.
CPC ................ *A62B 3/005* (2013.01); *B25F 5/02* (2013.01); *B25F 5/005* (2013.01)

(58) Field of Classification Search
CPC ............. A62B 3/005; B25F 5/02; B25F 5/005
See application file for complete search history.

(56) References Cited

U.S. PATENT DOCUMENTS 5,272,811 A * 12/1993 Armand .................. B25B 33/00 30/228
5,525,842 A * 6/1996 Leininger ............ H02K 1/2713 290/43

(Continued)

FOREIGN PATENT DOCUMENTS

CN 102528720 A 7/2012
CN 105041764 A 11/2015

(Continued)

OTHER PUBLICATIONS

International Search Report and Written Opinion of the International Searching Authority for International Patent Application No. PCT/EP2018/082545 dated Aug. 21, 2019, 16 pages.

(Continued)

*Primary Examiner* — Anna K Kinsaul
*Assistant Examiner* — Lucas E. A. Palmer
(74) *Attorney, Agent, or Firm* — Panitch Schwarze Belisario & Nadel LLP

(57) ABSTRACT

A mobile portable tool, such as a spreading device, cutting device or combined device with cutting and spreading function includes a housing. An electric motor is located in the housing. The tool includes a rechargeable battery or a connection to an external electrical energy source. The tool is a mechanically or hydraulically driven and has a displaceable piston rod spreading and/or cutting and/or lifting and/or pressing work. An electronic open-loop and closed-loop control unit controls the electric motor and includes a printed circuit board and control cables with a connector for transporting control signals. For under water operation while still having a simple design, the electric motor is a brushless direct-current motor. The electronic components of the printed circuit board are enclosed by a potting compound to (Continued)

prevent water entering, and the connector of the control cable is protected against the ingress of water.

18 Claims, 6 Drawing Sheets

(56) References Cited

U.S. PATENT DOCUMENTS

| | | | | |
|---|---|---|---|---|
| 7,036,703 | B2 * | 5/2006 | Grazioli | B25F 5/00 702/41 |
| 2003/0071729 | A1 * | 4/2003 | Adolphson | G08B 21/0288 340/568.6 |
| 2007/0079980 | A1 * | 4/2007 | Kononenko | H02K 11/33 173/90 |
| 2011/0214471 | A1 * | 9/2011 | Wettlaufer | B25F 5/005 72/332 |
| 2013/0000934 | A1 | 1/2013 | Tadokoro et al. | |
| 2013/0039711 | A1 * | 2/2013 | Jonsson | B25H 1/0064 408/129 |
| 2013/0333908 | A1 * | 12/2013 | Lennartz | B25D 17/00 173/90 |
| 2014/0034149 | A1 * | 2/2014 | Kimura | F16L 37/34 137/315.01 |
| 2014/0054054 | A1 * | 2/2014 | Osborne | B25F 5/00 173/217 |
| 2014/0100687 | A1 * | 4/2014 | Ekstrom | B25C 1/06 700/160 |
| 2014/0379136 | A1 * | 12/2014 | Schlegel | B25B 21/00 700/275 |
| 2015/0042280 | A1 * | 2/2015 | Rief | H02J 7/0044 320/113 |
| 2015/0282337 | A1 * | 10/2015 | Ekstrom | H01H 9/061 173/170 |
| 2016/0020676 | A1 * | 1/2016 | Omura | B24B 23/028 310/50 |
| 2016/0178398 | A1 * | 6/2016 | Krapf | H01M 10/48 429/90 |
| 2017/0066130 | A1 * | 3/2017 | Corkum | B25J 9/1676 |
| 2017/0120435 | A1 * | 5/2017 | Palich | B25F 5/008 |
| 2017/0273209 | A1 * | 9/2017 | Gurr | H05K 5/0247 |
| 2019/0044110 | A1 * | 2/2019 | Sheeks | H02K 5/15 |
| 2019/0262981 | A1 * | 8/2019 | Sprenger | B25C 1/08 |
| 2019/0343016 | A1 * | 11/2019 | Wohlfrom | H05K 7/20509 |
| 2020/0306845 | A1 * | 10/2020 | Kimura | F15B 15/18 |
| 2021/0283429 | A1 * | 9/2021 | Allinger | H04W 4/80 |
| 2022/0339773 | A1 * | 10/2022 | Littwin | H01M 50/247 |

FOREIGN PATENT DOCUMENTS

| | | |
|---|---|---|
| CN | 208493032 U | 2/2019 |
| DE | 93 10 597 U1 | 5/1994 |
| EP | 1 724 043 A1 | 11/2006 |

OTHER PUBLICATIONS

"Brushless DC electric motor—Wikipedia, the free encyclopedia", 1-8 (Jan. 2014), retrieved from the Internet: https://web.archive.org/web/20140106110311/http://en.wikipedia.org/wiki/Brushless_DC_electric_motor.

GreatScott !., "How to Waterproof Electronics", YouTube, 2 pages (Dec. 2017), retrieved from the Internet: https://www.youtube.com/watch?v=h8ycmrolFQSs.

International Preliminary Report on Patentability for International Patent Application No. PCT/EP2018/082545, dated Mar. 31, 2021, 57 pages.

E-fixit network: "Test Panasonic Power Tools EY45A1 & EY7441", YouTube, 1 page (Apr. 9, 2013), Youtube.com, https: www.youtube.com/watch?v=RqZAlwvl7yM.

"Panasonic EY744/EY7940/EY7443/EY74A1/EY7451", Handbook for power tool, 176 pages (May 2018).

Buchenau, S., "Hydraulic rescue equipment in underwater use", Fire Brigade Magazine, 9 pages (Mar. 29, 2018), machine translation.

Javier, "Nemo Power Tools—Waterproof power tools—Tool Craze", Tool News and Reviews Blog, 6 pages (Dec. 15, 2015), https://toolcraze.net/nemo-power-tools-waterproof-power-tools/.

First Examination Report dated Nov. 24, 2022 in Indian Application No. 202117017026.

* cited by examiner

PORTABLE TOOL FOR MOBILE USE

This application is a National Stage Application of PCT/EP2018/082545, filed 26 Nov. 2018, and which application is incorporated herein by reference. To the extent appropriate, a claim of priority is made to the above-disclosed application.

The present application relates to an electromechanical or electrohydraulic tool for portable use such as a spreading device, cutting device, or combined device with cutting and spreading function or a lifting cylinder (or rescue cylinder). The aforementioned are preferably used for rescue operations.

TECHNOLOGICAL BACKGROUND

Portable, motor-driven electromechanical or electrohydraulic tools or rescue devices of the type of interest in this case are used in a wide variety of applications. For example, there are spreading devices, cutting devices or so-called combined devices, i.e. devices with cutting and spreading functions, as well as rescue cylinders that are used by emergency services (fire brigade), for example, to rescue injured people from accident vehicles or to rescue earthquake victims. The type of tool or rescue device is varied in this case. There are electrohydraulically or electromechanically driven tools or rescue devices with, preferably hardened, tool inserts for cutting, spreading, or pressing. Such devices are exposed to extremely high mechanical requirements in use and are subject to a wide variety of environmental influences (heat, cold, moisture) depending on the place of use.

It is of particular importance in this case that rescue devices in particular ensure particularly high operational reliability when in use, since rescue operations always have to be carried out quickly and sudden operational failures can therefore have fatal consequences.

In addition, in specific rescue situations, a tool must also be operated underwater, for example if an accident vehicle has crashed into a lake, river, or stream. In such situations, it has been extremely difficult to recover trapped people from their vehicle wrecks. In addition, in such a situation there is even less time for a rescue due to the possible ingress of water. However, the previous devices were not suitable for underwater use.

DOCUMENTED PRIOR ART

G 93 10 597.5 discloses a battery-operated underwater electrical device in the form of, for example, a pump. The underwater electrical device has a watertight tubular housing into which a housing end part equipped with O-sealing rings inserted in circumferential grooves is pressed. The construction is very complex.

OBJECT OF THE PRESENT INVENTION

The object of the present invention is to provide a tool which, on the one hand, allows use under water and, on the other hand, can be implemented with simple structural means.

Solution of the Problem

Relatively simple structural measures can ensure that the portable tool can also be operated if water should penetrate the interior of the housing, because a brushless direct-current motor is provided as the electric motor, the electronic components of the printed circuit board are enclosed with potting compound to prevent water from entering, and the connection elements of the control cable are protected against the ingress of water. In particular, it is possible to operate the tool under water if necessary. Compared to a conventional tool, only comparatively minor design changes are necessary to ensure this additional considerable functional advantage. The tool according to the invention can in particular also be used for rescue purposes, for example in a vehicle surrounded by water in which people are still located. People can be rescued from a vehicle wreck very quickly with the new tool.

Either a plug-in connection or a soldered connection can be provided as the connection means for the control cable on the printed circuit board. The sealing of the soldered connection against the ingress of water takes place by encapsulating the soldered connection with potting compound.

In particular, the tool according to the invention allows that no protective and/or sealing measures against the ingress of water into the interior of the housing have to be provided on the housing of the tool when immersing the housing in water. Such protective or sealing measures, especially in the case of complicated housings, are often very complex and costly in terms of construction.

In particular, the tool according to the invention has connection means for connecting a control line, the connection means being protected against the ingress of water. The control line itself usually has a waterproof insulation. Each control line expediently has a correspondingly sealed connection means. A part of the respective connection means can be arranged on the printed circuit board side and preferably also partially embedded there. The opposite part of the connection means is located on the control line. The connection means can be a plug-in connection or a plug-in/rotary connection, which is sealed, for example, using an O-ring.

Advantageously, the housing cannot include any protective and/or sealing measures against the ingress of water into the interior of the housing when immersing the housing in water.

The electronic open-loop and closed-loop control unit expediently comprises a display and/or control panel having a further printed circuit board on which electronic components can be arranged, which are also enclosed with potting compound to prevent water from entering. This further printed circuit board can be connected to the main printed circuit board arranged remotely in the housing via a control line described above.

The electronic open-loop and closed-loop control unit can comprise a sensor having a further printed circuit board on which electronic components are also arranged, which are also enclosed with potting compound to prevent water from entering. This additional printed circuit board can also be controlled via a control line described above or connected to the main printed circuit board arranged remotely in the housing.

Furthermore, two printed circuit boards can consist of the same printed circuit board base material or printed circuit board base plate equipped with electronic components, one printed circuit board being defined as a removal region from the other printed circuit board (remainder of the printed circuit board base material or printed circuit board base plate) and the two printed circuit boards being already connected in the scope of the assembly via a control cable. A soldered connection can be provided as the connection means of the control cable or cables. This makes it possible to produce the two printed circuit boards including control cables in one manufacturing process and to protect not only the electronic components as such but also the connection means for the control line for both printed circuit boards against the ingress of water in a simple manner by means of the potting compound.

An electrical contact between the electric motor and the wiring of the energy supply is expediently unprotected from water. This simplifies the construction to a considerable extent.

In particular, the electrical connections for power cables for the energy supply to the electric motor can, which are at a sufficient distance from one another, which distance ensures that, in the event that the connections are surrounded by water during electrical operating conditions of the tool, (e.g. with a nominal voltage of 24 volts) no electrical short-circuit occurs via the water as the electrical conduction medium.

The power cables preferably have a total of three strands (three phases).

Furthermore, a control panel can be provided on the tool. This can comprise a waterproof membrane keyboard, i.e. a membrane layering. A printed circuit board can be provided in the region of or below the control panel or the membrane keyboard.

This additional printed circuit board can also be controlled via a control line described above or connected to the main printed circuit board arranged remotely in the housing.

The front edge of the control panel, preferably the membrane keyboard, can also be covered by potting compound. The potting compound thus hermetically seals the membrane layering laterally along the circumference of the control panel.

In particular, in the region of the front edge of the control panel to the surrounding housing for receiving potting compound, a gap can be provided that preferably runs Furthermore, the gap can be covered on the outside by a protrusion of the control panel, i.e. it can be overlapped. This makes it possible to cast the arrangement "upside down" with potting compound, since the protrusion prevents the potting compound from "running out."

To accommodate the rechargeable battery, an insertion slot having open contact pins located therein that are not protected from water is preferably provided for making contact with the rechargeable battery.

The contact pins are expediently also at a sufficient distance from one another, which ensures that in the event that the contact pins are surrounded by water, no electrical short-circuit occurs during the above-mentioned electrical operating conditions of the tool via the water as the electrical conduction medium.

Control lines of the type described can connect the printed circuit boards to one another.

A membrane switch can be provided as an on and off switch.

A potting compound based on PU, epoxy, or silicone is preferably used as the potting compound. A silicone-based potting compound is particularly suitable when elevated temperatures occur.

DESCRIPTION OF THE INVENTION USING EMBODIMENTS

A preferred embodiment of the present invention will now be described in detail. For the sake of clarity, recurring features are provided only once with a reference sign. In the drawings.

Figure 1:
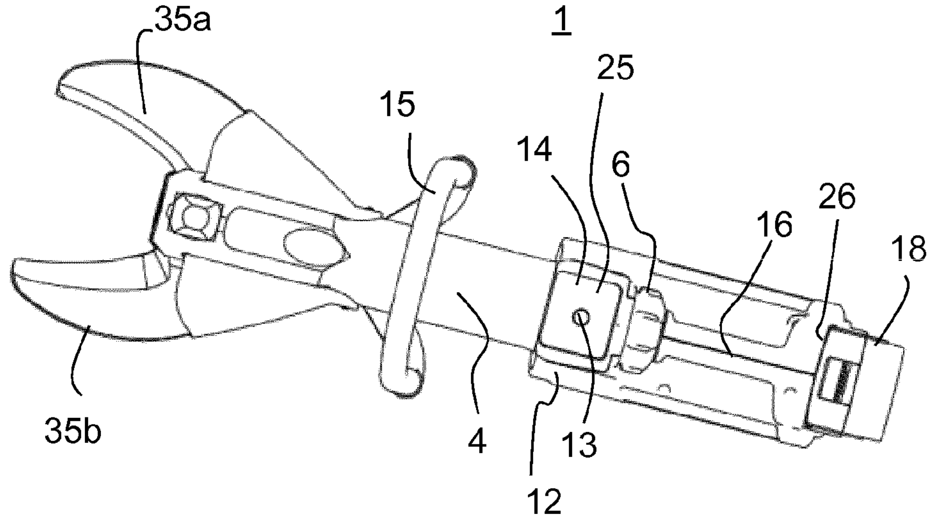
FIG. 1 is the representation of an overall view of an example of a tool in the form of an electro-hydraulic, battery-operated cutting device according to the invention.

Reference sign 1 in FIG. 1 denotes an example of a tool according to the invention in its entirety. In the embodiment according to FIG. 1, the tool 1 is an electro-hydraulic, battery-operated cutting device (cutter). The tool 1 comprises a housing 12 in which an electric motor 3 in the form of a brushless direct-current motor, a hydraulic pump 2, and a hydraulic tank 19 having hydraulic fluid 30 is located (see also FIGS. 2 and 3). In addition, a compensating device is provided for compensating the volume of the hydraulic fluid during operation of the tool 1. This can be, for example, a flexible membrane or an entirely flexible hydraulic tank. A control panel 25 having a display 14 and an on/off switch 13 is attached to the housing 12. The operator can read the operating states on the display 14. An insertion slot 26 for a rechargeable battery 18 is provided on the rear of the housing. Instead of the rechargeable battery, an energy supply unit (not shown in FIG. 1) could also be inserted at this point. The nominal voltage for operating the device is for example 24 volts.

In the example shown, two tool halves 35*a*, 35*b*, which are cutting tool halves in the embodiment shown in FIG. 1, are located on the front side of the tool 1. The two cutting tool halves 11*a*, 11*b* are driven via a piston rod (not shown in FIG. 1). The latter is located in a hydraulic cylinder 4. A first handle 15 is located in the region of the hydraulic cylinder 4. A second handle 16 is provided on the housing 12. The tool 1 can thus be guided or operated by the operator with two hands. Using a manually operated hydraulic valve 6, the operator can manually control the direction of the hydraulic flow with the hand located on the second handle 16 so that the piston rod is either retracted (with the tool halves 35*a*, 35*b* being closed) or extended (with the tool halves 35*a*, 35*b* being opened) or hydraulic oil is returned to the supply circuit, i.e. to the hydraulic tank (bypass operation).

The embodiment of the control valve 6 shown in FIG. 1 is a control valve which can be rotated in the extension of the axis of the handle 16 and has a so-called star handle which is rotated by the operator to control the switching positions. The housing 12 comprises two housing shells which (cf. FIG. 3) are connected to one another via connecting elements 7, for example screws. No seal is provided to protect against the ingress of water into the housing 12 when immersing the housing 12 in water.

The tools in question in this case are able to be operated in any spatial arrangement or orientation.

Instead of the cutting device described above, the invention can also be designed as a spreading device, a combined device having cutting and spreading functions, or as a lifting or rescue cylinder. A piston rod that is guided in a cylinder, for example a hydraulic cylinder, is used in all of these devices.

Figure 2:
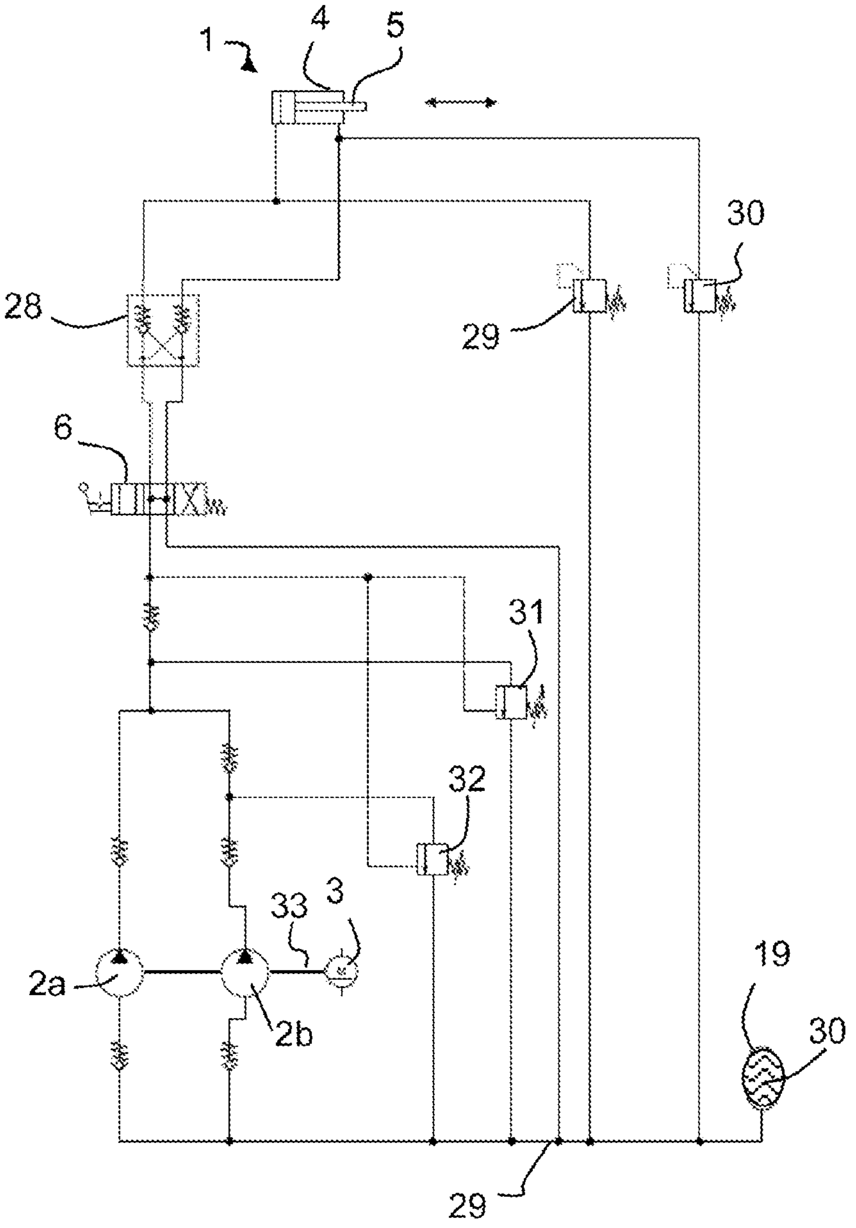
FIG. 2 is an example of a hydraulic circuit diagram of the cutting device according to FIG. 1.

FIG. 2 shows an example of a hydraulic circuit diagram of a tool according to FIG. 1. The electric motor is a brushless direct-current motor which drives two piston compressors 2*a*, 2*b* via an eccentric shaft 36. The piston compressor 2*b* can have a greater delivery rate than the piston compressor 2*a*. The delivery flow of the piston compressor 2*b* is, for example, passed to a pressure switching valve 32. The delivery flow of the piston compressor 2*a* is also passed to the pressure switching valve 32 as a control signal. The pressure switching valve 32 can be set to a specific pressure switching value by means of spring force. If the pressure in the control line of the piston compressor 2*a* exceeds this pressure switching value, the pressure switching valve 32 is opened and the delivery flow of the piston compressor 2*b* is diverted into the tank 19. This ensures that the drive power required by the system remains within the available drive power.

The delivery flow branches in the further course in the direction of the switching valve 6 and the pressure shut-off valve 31. The pressure shut-off valve 31 is set to the permissible system pressure by means of spring force. If the pressure exceeds the set permissible system pressure, the pressure shut-off valve 31 opens and allows the delivery flow to flow back into the tank until the pressure falls below the permissible pressure again.

The control valve 6 is operated manually by the user by means of a star handle (see FIG. 1). It has a spring-assisted reset function in the neutral position. In the neutral position (as shown), it is located in the middle position. In this position, all connected lines are connected to the tank so that no pressure can build up and the system does not move. If the control valve 6 is deflected, for example, to the right, then in the left connection line the pressurized delivery flow is conveyed in the direction of the double-releasable check valve 28. On the right connection line, hydraulic oil that comes from the direction of the double-releasable check valve 28 is returned to the tank 19. If the control valve 6 is deflected to the left, the process just described is reversed, so that ultimately the direction of movement of the device is reversed. The delivery flow that is conveyed into the left connection line of the double releasable check valve 28 opens a spring-loaded check valve in the left connection line and, via a control line that is guided to the right connection line, also opens the check valve located there. This ensures that, on the one hand, the delivery flow in the left connection line can be fed to the hydraulic cylinder 4 of the device. On the other hand, it is ensured that the hydraulic oil that is displaced out of the cylinder by the hydraulic cylinder 4 on the right-hand side can be returned to the system's tank 19 through the double-releasable check valve 28 on the right-hand connection line.

The hydraulic cylinder 4 has a branch to safety valves 29, 30 at both connections. These safety valves 29, 30 ensure that the pressure in the cylinder chambers cannot rise higher than permitted. If the pressure in one or in both cylinder chambers rises above the safety-related permissible pressure, these valves open a connection to the tank 19 so that the pressure can decrease again. The pressure inside the hydraulic cylinder 4 can increase, for example, because forces acting on the piston of the hydraulic cylinder 4 from outside additionally compress the hydraulic oil. Devices are attached to the piston rod 5 of the hydraulic cylinder 4 which move, for example, a shear knife, a spreader, or the like. The tank 19 can, for example, be designed as a flexible rubber bellows and at the same time serves as a compensating device.

Figure 3:
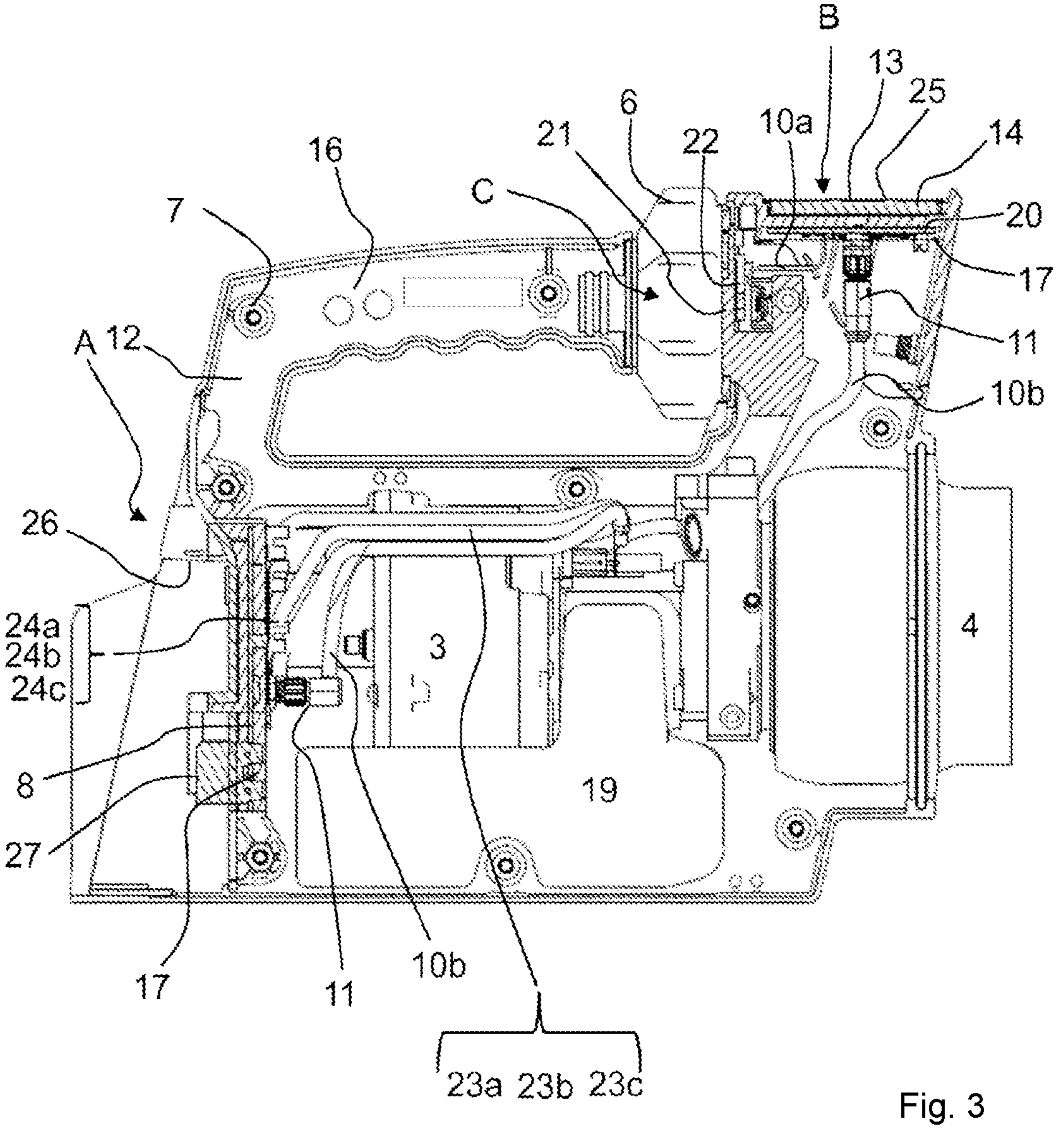
FIG. 3 is a partial sectional representation of the housing region of the tool according to the invention in accordance with FIG. 1.

FIG. 3 shows, in a partial sectional representation, the interior of the region of the housing 12 of the tool 1 from FIG. 1. The electronic open-loop and closed-loop control unit for open-loop and/or closed-loop control comprises a printed circuit board 8 having electronic components 9, which in particular relate to the power supply for the brushless direct-current motor. Furthermore, in the region of the on/off switch 13, a control panel having a display 14 is provided, which comprises its own printed circuit board 20. The control panel of the display 14 is preferably a waterproof membrane keyboard. The necessary operations can be carried out using the membrane keyboard. Furthermore, a further printed circuit board 22 is provided in the region of the control valve 6, on which a sensor 21, in particular a magnetic sensor, is located as an electronic component for detecting the deflection of the star handle of the control valve 6. With the rotation of the star handle, not only is the hydraulic position of the control valve 6 changed, but also the electric motor is switched on or off and/or a turbo function is switched on and/or off via the angular position of the star handle. The sensor 21 is connected to the printed circuit board 20 via a control line 10*a*. The printed circuit board 20 is connected to the printed circuit board 8, which represents the main printed circuit board, via a further control line 10*b*. The control line 10*b* is connected to the printed circuit board 20 and/or the printed circuit board 8 via watertight connection means 11. A part of the respective connection means 11 can be arranged on the printed circuit board side and can preferably also be partially embedded there. The opposite part of the connection means 11 is located on the control line 10*a* or 10*b*. The connection means 11 can be a plug-in connection and/or rotary connection which is sealed by a sealing means (not shown in the drawings), for example an O-ring.

The control lines 10*a* and/or 10*b* are each lines via which control signals are sent. A direct connection to the printed circuit board is provided in the embodiment according to FIG. 3, for example via a soldered connection, as connection means 11 of the control line 10*a* to the electronic components of the printed circuit board 20 and the printed circuit board 22 of the sensor 21. Plug-in and/or rotary connectors are provided in FIG. 3 as the connection means 11 of the control line 10*b* between the printed circuit board 8 and the printed circuit board 20.

Furthermore, in the region of the printed circuit board 8, power cables for the energy supply of the electric motor 3 are arranged, which are in electrical connection with contact pins 27 for the rechargeable battery or an energy supply unit. In the example shown, there is a three-phase connection with three power cables 23*a*, 23*b* and 23*c*. In particular, the electrical connections 24*a* to 24*c* of the power cables 23*a*, 23*b* and 23*c* for the energy supply of the electric motor 3 can be spaced apart by a sufficient distance from one another, which ensures that, in the event that the connections 24*a* to 24*c* are surrounded by water during electrical operating conditions of the tool, (e.g. with a nominal voltage of 24 volts), no electrical short-circuit occurs via the water as the electrical conduction medium. Corresponding connections are also provided on the electric motor 3, but cannot be seen in FIG. 3.

Figure 4:
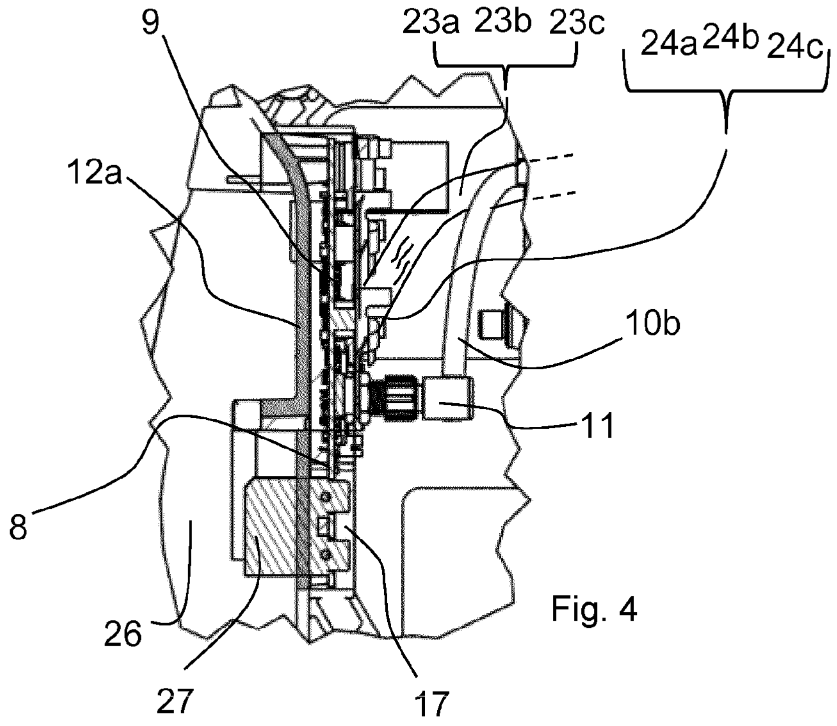
FIG. 4 is an enlarged representation of the region A of FIG. 3.

In the region of the insertion slot 28, open contact pins 27, which are unprotected from water, are provided for electrical contact with a rechargeable battery (not shown in FIG. 4) or an energy supply unit. The contact pins 27 are also at a sufficient distance from one another, which ensures that, in the event that the contact pins 27 are surrounded by water, no electrical short-circuit occurs during the electrical operating conditions of the tool via the water as the electrical conduction medium. The contact pins 27 and the printed circuit board 8 are attached to a housing part 12*a* (battery holder). The control line 10*b* comprises connection means 11 which are protected from water.

Figure 5:
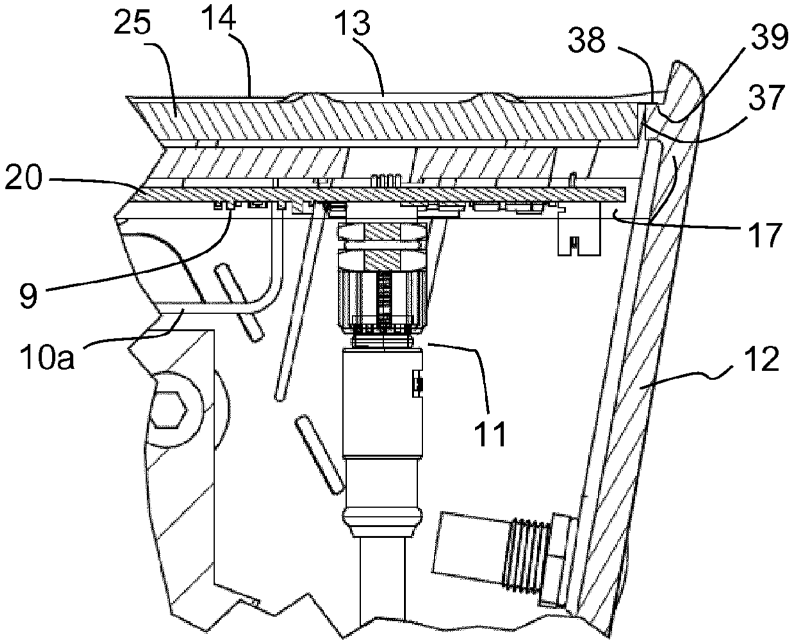
FIG. 5 is an enlarged representation of the region B of FIG. 3.

From the enlarged partial representation of FIG. 5, the electronic components 9 of the printed circuit board 20 can be seen, which are enclosed by potting compound 17. The printed circuit board side part of the connection means 11 for the printed circuit board 20 can also be seen in FIG. 5. The control panel 25 is designed as a membrane keyboard. This is a sandwich-shaped membrane layer structure. The front edge of the control panel 25, i.e. of this structure, is also covered by potting compound 17. For this purpose, a gap 37 to the housing 12, which preferably runs completely around the control panel 25, is seen in the region of the front edge of the control panel 25. The gap 37 is covered on the outside by a protrusion 38 of the control panel 25 or the membrane keyboard (e.g. in the form of a protruding membrane layer on the top, which is glued to a step 39 of the housing 12), so that a circumferential annular blind hole is created which can be filled with potting compound 17. In this way, the entire region can be potted "overhead" with potting compound 17.

Figure 6:
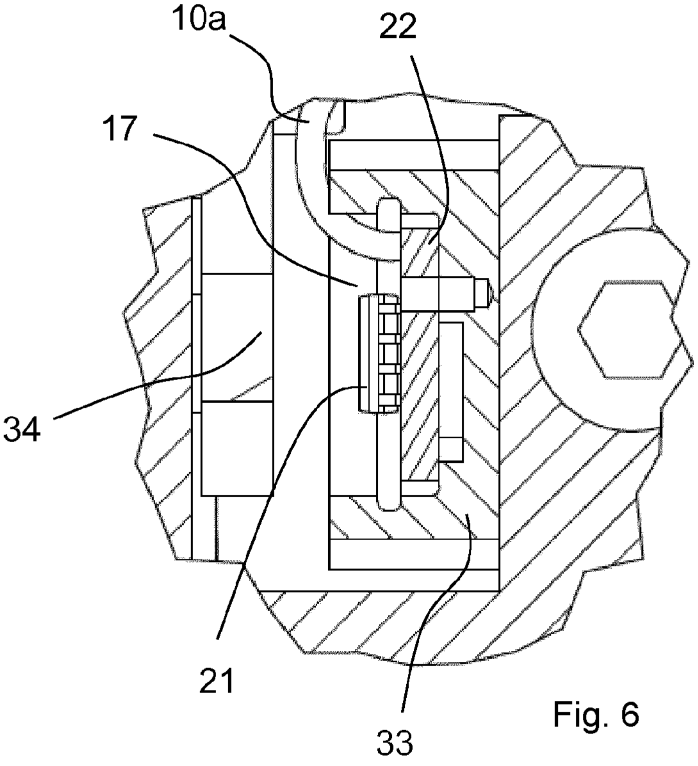
FIG. 6 is an enlarged representation of the region C of FIG. 3.

The enlarged partial representation of FIG. 6 shows the magnetic sensor 21 for determining the deflection of the star handle. This is located on its own printed circuit board 22, which is disposed in a sensor holder 33 in the form of a pocket-shaped recess. The magnetic sensor 21 and the printed circuit board 22 are sealed off from the outside of the sensor holder 33 by a potting compound 17. The potting compound 17 thus closes the pocket-like recess of the sensor holder 33 to the outside. The control line 10*a*, which leads from the printed circuit board 22 to the printed circuit board 20 of the control panel or display 14, is also connected to the printed circuit board 22 and enclosed by the potting compound 17. There, the end region of the control line 10*a* is also enclosed by potting compound 17.

Figure 7:
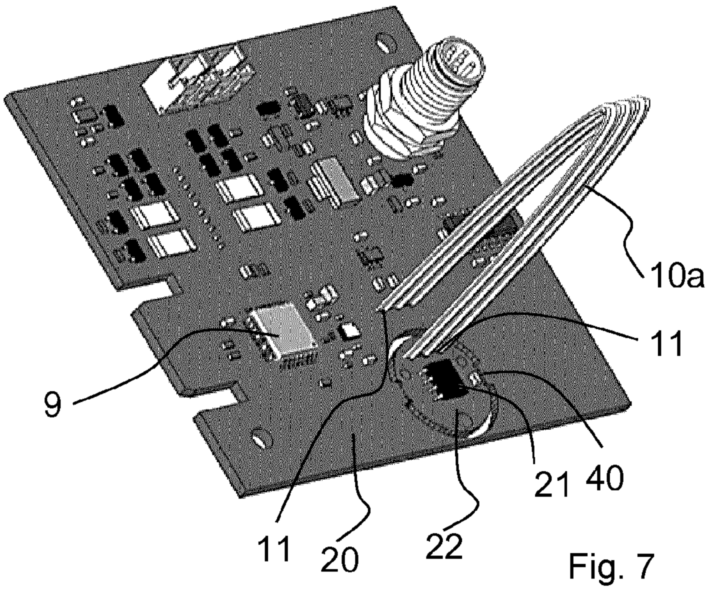
FIG. 7 is a perspective representation of an example of a printed circuit board assembly for use in the context of the present invention and FIG. 8 is a plan view of an example of a control panel having a display arrangement according to the present invention.

FIG. 7 shows the two printed circuit boards 20, 22 having electronic components 9 (the printed circuit board 22 having an electronic component, for example in the form of the magnetic sensor 21) in the initial state before assembly. They consist of the same printed circuit board base material. The printed circuit board 22 is defined as a removal region from the other printed circuit board 20. The two printed circuit boards 20, 22 are connected via the control cable 10*a*. A soldered connection is provided as the respective connection means 11 on both printed circuit boards 20, 22. Furthermore, two predetermined separation points 40 are provided, which must be destroyed in order to remove the printed circuit board 22, as a result of which the printed circuit board 22 having wiring can be removed. The connection means 11 are then enclosed when casting the printed circuit boards 20, 22 with potting compound 17.

Figure 8:
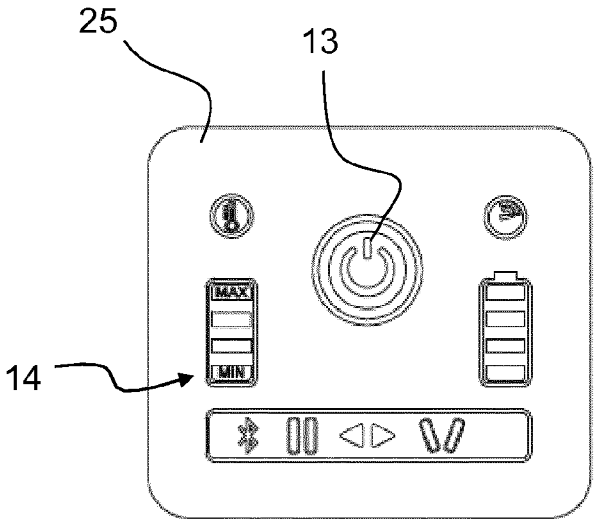

FIG. 8 is an enlarged, isolated representation of the control panel 25 with the on/off switch 13 and the display 14 with various displays and control panels. The control panel 25 is preferably designed as a waterproof membrane keyboard.

The present invention makes it possible to operate the tool 1 also under water without the housing 12 having to be sealed. This new, important functionality can thus be achieved without complex conversion measures or without any significant increase in manufacturing costs.

The electronic components of the printed circuit board 8, 20, and/or 22 are in particular microcontrollers, frequency converters, memory modules, electronic switches, measuring devices such as, for example, integrated semiconductor temperature sensors and/or LEDs.

The display 14 includes a display device, which in turn can include, for example, a load display and/or operating status display and/or temperature display.

The rechargeable battery 18 has a waterproof housing or at least an independent waterproof encapsulation.

The on/off switch 13 is a waterproof on/off switch, for example a membrane switch or a push button switch.

A potting compound based on PU, epoxy, or silicone can preferably be used as the potting compound. A silicone-based potting compound is particularly suitable if elevated temperatures occur during operation of the tool 1.

As an alternative to the rechargeable battery 18, an energy supply unit (not shown in the drawings), which is connected to the network via a cable, can also be inserted into the insertion slot 26.

It is expressly pointed out that the combination of individual features and sub-features is also to be regarded as substantial to the invention and is included in the disclosure content of the application.

LIST OF REFERENCE SIGNS

1 Tool
2*a* Piston compressor
2*b* Piston compressor
3 Electric motor
4 Hydraulic cylinder
5 Piston rod
6 Control valve
7 Connecting element
8 Printed circuit board
9 Electronic component
10 Control cable
11 Connection means
12 Housing
12*a* Housing rechargeable battery holder
13 On/off switch
14 Display
15 First handle
16 Second handle
17 Potting compound
18 Rechargeable battery
19 Hydraulic tank
20 Printed circuit board
21 Magnetic sensor
22 Printed circuit board
23*a* Power cable
23*b* Power cable
23*c* Power cable
24*a* Electrical connection
24*b* Electrical connection
24*c* Electrical connection
25 Control panel
26 Insertion slot
27 Contact pin
28 Check valve
29*a* Safety valve
29*b* Safety valve
30 Hydraulic fluid
31 Pressure shut-off valve

32 Pressure switching valve
33 Sensor holder
34 Magnet holder
35*a* Tool half
35*b* Tool half
36 Eccentric shaft
37 Gap
38 Protrusion
39 Step
40 Predetermined separation point

The invention claimed is:

1. Portable tool, such as a spreading device, cutting device, or combined device having cutting and spreading function, for portable use with a housing, an electric motor located in the housing, an energy supply comprising:

a rechargeable battery disposed on the tool, or a connection to connect to an external electrical energy source, a mechanically or hydraulically driven, displaceable piston rod for carrying out spreading work or cutting work or lifting or pushing work, an open-loop and closed-loop control unit for open-loop or closed-loop control of the electric motor, which comprises at least one printed circuit board on which electronic components are arranged, and at least one control cable for transporting signals to the control unit, the control cables having a connector for connection to the printed circuit board, wherein the electric motor comprises a brushless direct-current motor, the electronic components of the printed circuit board are enclosed with potting compound to prevent water from entering, and the connector of the control cable is protected against the ingress of water, and wherein the electronic open-loop and closed-loop control unit comprises a control panel or a display having a further printed circuit board on which electronic components are arranged, and the electronic components of the printed circuit board are also enclosed with potting compound to prevent water from entering.

2. Tool according to claim 1, wherein the connector comprises a plug-in connection or a soldered connection.

3. Tool according to claim 1, wherein the soldered connection of the potting compound is closed to the outside.

4. Tool according to claim 1, wherein the housing is free of protective or sealing measures on the housing to prevent water from entering the interior of the housing when immersing the housing in water.

5. Tool according to claim 1, wherein two printed circuit boards have the same printed circuit board base material, one printed circuit board is configured as a removal region from the other printed circuit board, the two printed circuit boards are connected via a control cable, and the connector comprises a soldered connection on both printed circuit boards.

6. Tool according to claim 1, comprising electrical contacting of the electric motor with the energy supply, which is unprotected from water.

7. Tool according to claim 1, comprising electrical connections for power cables for the energy supply of the electric motor, which are at a sufficient distance from one another, which ensures that in the event that the connections are surrounded by water, no electrical short-circuit occurs during the electrical operating conditions of the tool via the water as the electrical conduction medium.

8. Tool according to claim 1, wherein the control panel comprises a membrane keyboard.

9. Tool according to claim 8, wherein the membrane keyboard is in the region of the further printed circuit board.

10. Tool according to claim 8, wherein the membrane keyboard is covered by potting compound.

11. Tool according to claim 10, wherein in the region of the front edge of the control panel, a gap is provided which runs completely around the control panel and is covered on the outside by a protrusion of the control panel.

12. Tool according to claim 1, wherein a front edge of the control panel, is covered by potting compound.

13. Tool according to claim 12, wherein in the region of the front edge of the control panel, a gap is provided which runs completely around the control panel and is covered on the outside by a protrusion of the control panel.

14. Tool according to claim 1, wherein an insertion slot having open contact pins located therein for making contact with the rechargeable battery is provided to accommodate the rechargeable battery.

15. Tool according to claim 14, wherein the contact pins are at a sufficient distance from one another, which ensures that, in the event that the contact pins are surrounded by water, no electrical short-circuit occurs during the electrical operating conditions of the tool via the water as the electrical conduction medium.

16. Tool according to claim 1, comprising a membrane switch as an on and off switch.

17. Tool according to claim 1, wherein a potting compound based on PU, epoxy, or silicone is used as the potting compound.

18. Portable Tool, such as a spreading device, cutting device, or combined device having cutting and spreading function, for portable use with a housing, an electric motor located in the housing, an energy supply comprising:

a rechargeable battery disposed on the tool, or a connection to connect to an external electrical energy source, a mechanically or hydraulically driven, displaceable piston rod for carrying out spreading work or cutting work or lifting or pushing work, an open-loop and closed-loop control unit for open-loop or closed-loop control of the electric motor, which comprises at least one printed circuit board on which electronic components are arranged, and at least one control cable for transporting signals to the control unit, the control cables having a connector for connection to the printed circuit board, wherein the electric motor comprises a brushless direct-current motor, the electronic components of the printed circuit board are enclosed with potting compound to prevent water from entering, and the connector of the control cable is protected against the ingress of water, and wherein the electronic open-loop and closed-loop control unit comprises a sensor having a further printed circuit board on which electronic components are arranged, and the electronic components of the printed circuit board are enclosed with potting compound to prevent water from entering.

* * * * *